United States Patent
Kim et al.

(10) Patent No.: US 11,330,169 B2
(45) Date of Patent: *May 10, 2022

(54) SPOT DETECTING APPARATUS AND METHOD OF DETECTING SPOT USING THE SAME

(71) Applicant: Samsung Display Co., Ltd., Yongin-Si (KR)

(72) Inventors: Se-Yun Kim, Cheonan-si (KR); Hoi-Sik Moon, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,303

(22) Filed: Jan. 26, 2021

(65) Prior Publication Data
US 2021/0152738 A1    May 20, 2021

Related U.S. Application Data

(63) Continuation of application No. 15/986,262, filed on May 22, 2018, now Pat. No. 10,939,036.

(30) Foreign Application Priority Data

May 23, 2017    (KR) .................... 10-2017-0063688

(51) Int. Cl.
*H04N 5/232*    (2006.01)
*H04N 5/372*    (2011.01)
*G06T 7/00*    (2017.01)

(52) U.S. Cl.
CPC ......... *H04N 5/23232* (2013.01); *G06T 7/001* (2013.01); *H04N 5/232* (2013.01);
(Continued)

(58) Field of Classification Search
CPC .... H04N 5/23232; H04N 5/232; H04N 5/372; G06T 7/001; G06T 2207/30121; G06T 2207/10016
See application file for complete search history.

(56) References Cited

U.S. PATENT DOCUMENTS 5,717,780 A * 2/1998 Mitsumune ............ H04N 17/04
   382/141
6,219,443 B1 * 4/2001 Lawrence ............ G06T 7/0006
   324/760.01

(Continued)

FOREIGN PATENT DOCUMENTS

KR    1020080098852 A    11/2008
KR    1020140073259 A    6/2014
(Continued)

OTHER PUBLICATIONS

Google.com "spot detecting part", retrieved from https://www.google.com/search?q=%22spot+detecting+part%22 on Nov. 5, 2021 (Year: 2021).*

(Continued)

*Primary Examiner* — Timothy J Henn
(74) *Attorney, Agent, or Firm* — Cantor Colburn LLP

(57) ABSTRACT

A spot detecting apparatus includes a photographing part and a spot detecting part. The photographing part photographs, in a first resolution, an image displayed on a display panel to output first resolution image data, and photograph, in a second resolution, the image displayed on the display panel to output second resolution image data, where the second resolution is higher than the first resolution, and the image displayed on the display panel includes a first spot greater than or equal to a reference size and a second spot less than the reference size. The spot detecting part receives the first resolution image data and the second resolution (Continued)

image data, and subtracts the first resolution image data from the second resolution image data to detect the second spot.

18 Claims, 8 Drawing Sheets

(52) U.S. Cl.
CPC ... *H04N 5/372* (2013.01); *G06T 2207/10016* (2013.01); *G06T 2207/30121* (2013.01)

(56) References Cited

U.S. PATENT DOCUMENTS

| | | | |
|---|---|---|---|
| 2017/0278232 A1* | 9/2017 | Parsons | G02F 1/1309 |
| 2018/0211374 A1* | 7/2018 | Tanaka | G06T 7/001 |
| 2018/0246044 A1* | 8/2018 | Zhang | G01N 21/95 |
| 2019/0189083 A1* | 6/2019 | Lee | G09G 5/10 |
| 2019/0191153 A1 | 6/2019 | Speigle et al. | |
| 2020/0134845 A1* | 4/2020 | Wang | G06T 7/337 |
| 2020/0202505 A1* | 6/2020 | Tsai | G09G 3/36 |

FOREIGN PATENT DOCUMENTS

| | | |
|---|---|---|
| KR | 1020140121068 A | 10/2014 |
| KR | 1020160006852 A | 1/2016 |
| KR | 1020160054151 A | 5/2016 |
| KR | 101716111 B1 | 3/2017 |

OTHER PUBLICATIONS

Google.com "subtracting part", retrieved from https://www.google.com/search?q=%22subtracting+part%22 on Nov. 5, 2021 (Year: 2021).*

Google.com "tiny spot detecting part", retrieved from https://www.google.com/search?q=%22tiny+spot+detecting+part%22 on Nov. 5, 2021 (Year: 2021).*

Google.com "tiny spot quantifying part", retrieved from https://www.google.com/search?q=%22tiny+spot+quantifying+part%22 on Nov. 5, 2021 (Year: 2021).*

Google.com "first resolution image data outputting part", retrieved from https://www.google.com/search?q=%22first+resolution+image+data+outputting+part%22 on Nov. 5, 2021 (Year: 2021).*

Google.com "second resolution image data outputting part", retrieved from https://www.google.com/search?q=%22second+resolution+image+data+outputting+part%22 on Nov. 5, 2021 (Year: 2021).*

Dictionary.com "part", retrieved from https://www.dictionary.com/browse/part on Dec. 18, 2021 (Year: 2021).*

Oh, Jong Hwan, et al., "Line defect detection in TFT-LCD using directional filter bank and adaptive multilevel thresholding " Key Engineering Materials. vol. 270, pp. 233-238. Trans Tech Publications Ltd, 2004. (Year: 2004).

* cited by examiner

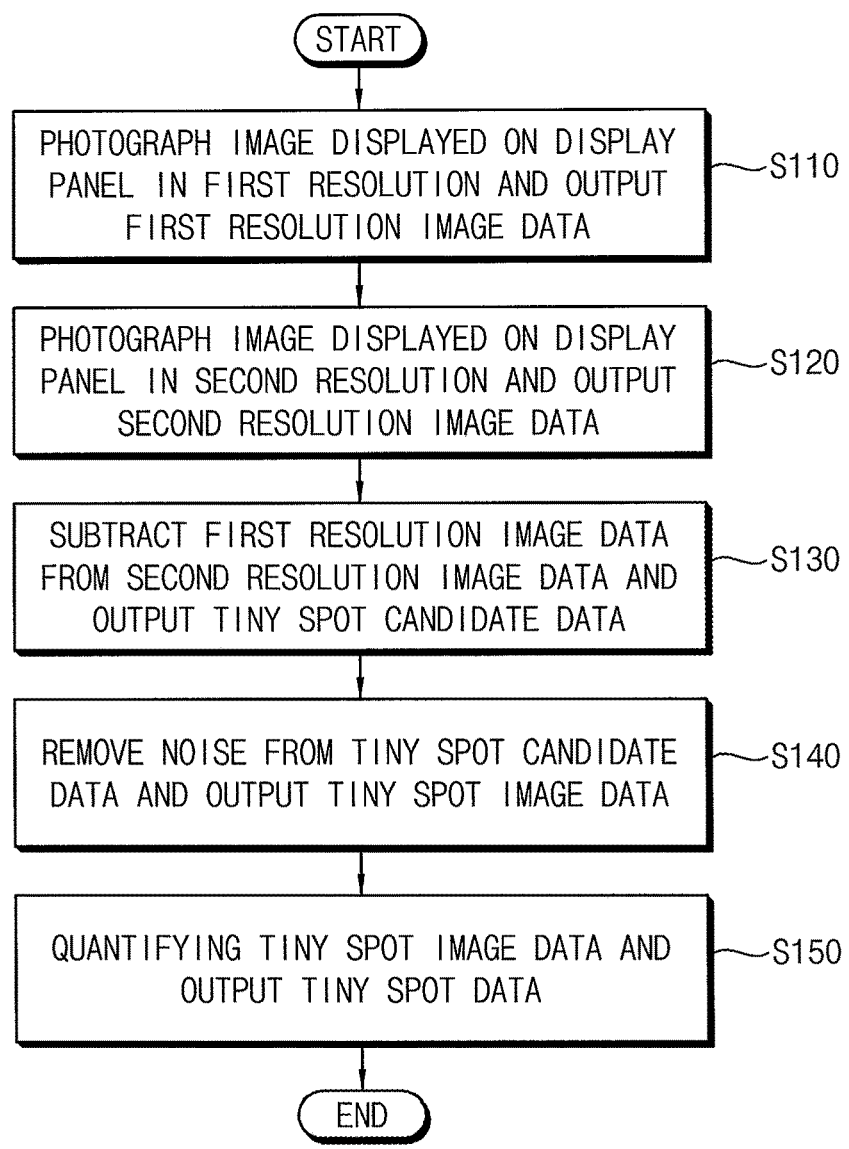

SPOT DETECTING APPARATUS AND METHOD OF DETECTING SPOT USING THE SAME

This application is a continuation of U.S. patent application Ser. No. 15/986,262, filed on May 22, 2018, which claims priority to Korean Patent Application No. 10-2017-0063688, filed on May 23, 2017, and all the benefits accruing therefrom under 35 U.S.C. § 119, the content of in its entirety which is herein incorporated by reference.

BACKGROUND

1. Field

Exemplary embodiments of the invention relate to an image display, and more particularly to a spot detecting apparatus and a method of detecting a spot using the spot detecting apparatus.

2. Description of the Related Art

A display apparatus, such as a liquid crystal display ("LCD"), a plasma display panel ("PDP") display, a field emission display ("FED"), an organic light emitting diode ("OLED") display, typically includes a display panel and a display panel driving apparatus.

The display panel receives image data to display an image. The display panel typically includes a gate line, a data line, and a pixel connected to the gate line and the data line, to display the image.

The display panel driving apparatus drives the display panel. The display panel driving apparatus typically includes a gate driving part for driving the gate line, and a data driving part for driving the data line.

After the display panel in the display apparatus is manufactured, an inspection process is performed for checking whether the display panel displays a spot. In the past, the inspection process of the display panel is performed through eyes of a human. However, recently, the image displayed on the display panel is photographed using an optical device, such as a charge coupled device ("CCD") camera, the photographed image is analyzed, the display panel is inspected, and the pixel in the display panel is compensated.

SUMMARY

Exemplary embodiments of the invention provide a spot detecting apparatus which automatically detects a tiny spot.

Exemplary embodiments of the invention also provide a method of detecting a tiny spot using the spot detecting apparatus.

According to an exemplary embodiment of the invention, a spot detecting apparatus includes a photographing part and a spot detecting part. In such an embodiment, the photographing part photographs, in a first resolution, an image displayed on a display panel to output first resolution image data, and photograph, in a second resolution, the image displayed on the display panel to output second resolution image data, where the second resolution is higher than the first resolution, and the image displayed on the display panel includes a first spot greater than or equal to a reference size and a second spot less than the reference size. In such an embodiment, the spot detecting part receives the first resolution image data and the second resolution image data, and subtracts the first resolution image data from the second resolution image data to detect the second spot.

In an exemplary embodiment, the spot detecting part may include a subtracting part which subtracts the first resolution image data from the second resolution image data to output tiny spot candidate data including the second spot.

In an exemplary embodiment, the spot detecting part may further include a tiny spot detecting part which removes a noise, which is different from the first spot and the second spot, from the tiny spot candidate data to detect the second spot.

In an exemplary embodiment, the noise may include a Gaussian normal distribution, and the tiny spot detecting part may detect the second spot in an area except for an area corresponding to the Gaussian normal distribution.

In an exemplary embodiment, the tiny spot detecting part may detect the second spot in an area except for an area corresponding to L* standard deviation in a histogram of the noise and the second spot, where L is a natural number.

In an exemplary embodiment, the spot detecting part may further include a tiny spot quantifying part which quantifies tiny spot image data corresponding to the second spot.

In an exemplary embodiment, the tiny spot quantifying part may output tiny spot data, which is generated by quantifying the second spot based on a size and a depth of the second spot.

In an exemplary embodiment, a length of a horizontal axis in a graph showing the second spot may denote the size of the second spot, and a height of a vertical axis in a graph showing the second spot may denote the depth of the second spot.

In an exemplary embodiment, the photographing part may include a first resolution image data outputting part configured to photograph the image displayed on the display panel, in the first resolution to output the first resolution image data, and a second resolution image data outputting part configured to photograph the image displayed on the display panel, in the second resolution to output the second resolution image data.

In an exemplary embodiment, the first resolution image data outputting part may include N×N pixel filter, and the second resolution image data outputting part may include M×M pixel filter, where N is a natural number greater than or equal to two, and M is a natural number less than N.

In an exemplary embodiment, N may be determined based on a maximum width of the second spot, and M may be determined based on a minimum width of the second spot.

In an exemplary embodiment, the spot detecting part may increase a removing rate of an area except for the second spot compared to a removing rate of the second spot, when the subtracting part subtracts the first resolution image data from the second resolution image data.

In an exemplary embodiment, the second resolution may be the same as a resolution of the display panel.

In an exemplary embodiment, each of the first spot and the second spot may be a white spot.

According to an exemplary embodiment of the invention, a method of detecting a spot includes: photographing, in a first resolution, an image displayed on a display panel to output first resolution image data, where the image displayed on the display panel includes a first spot greater than or equal to a reference size and a second spot less than the reference size; photographing, in a second resolution, the image displayed on the display panel to output second resolution image data, where the second resolution is higher than the first resolution; and subtracting the first resolution image data from the second resolution image data to detect the second spot.

In an exemplary embodiment, the detecting the second spot may include outputting tiny spot candidate data including the second spot, and removing a noise, which is different from the first spot and the second spot, from the tiny spot candidate data to detect the second spot.

In an exemplary embodiment, the removing the noise from the tiny spot candidate data may include detecting the second spot in an area except for an area corresponding to a Gaussian normal distribution.

In an exemplary embodiment, the method may further include quantifying tiny spot image data corresponding to the second spot.

In an exemplary embodiment, the quantifying the tiny spot image data may include outputting tiny spot data, which is generated by quantifying the second spot based on a size and a depth of the second spot.

In an exemplary embodiment, the subtracting the first resolution image data from the second resolution image data to detect the second spot may include increasing a removing rate of an area except for the second spot compared to a removing rate of the second spot.

According to exemplary embodiments of the invention, a spot detecting system may automatically detect a tiny spot which is not recognized easily by a naked eye. Therefore, a spot compensating apparatus disposed outside the spot detecting system may compensate for the tiny spot based on tiny spot data output from the spot detecting apparatus. Thus, display quality of a display apparatus may be improved.

BRIEF DESCRIPTION OF THE DRAWINGS

The above and other features of the invention will become more apparent by describing in detailed exemplary embodiments thereof with reference to the accompanying drawings, in which:

FIG. 10 is a flowchart illustrating an exemplary embodiment of a method of detecting a spot using the spot detecting apparatus of FIG. 1.

DETAILED DESCRIPTION

Figure 1:
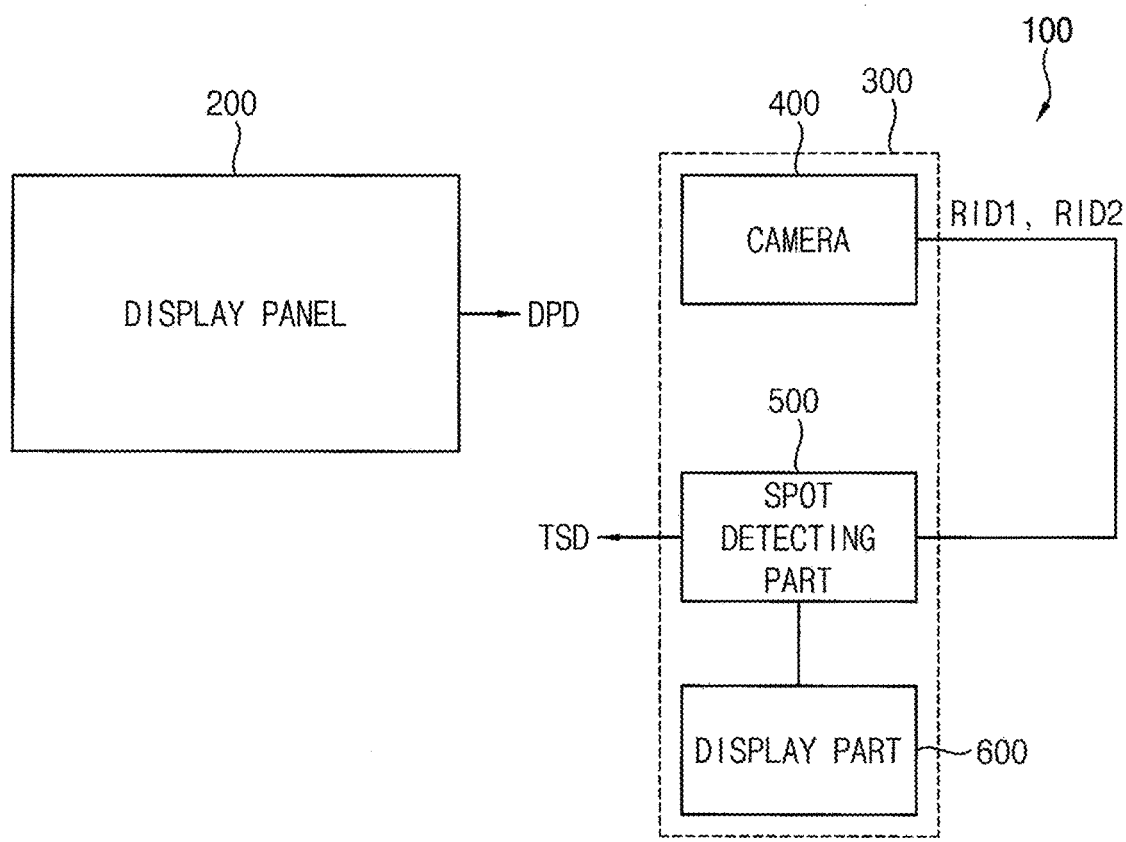
FIG. 1 is a block diagram illustrating a spot detecting system according to an exemplary embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

FIG. 1 is a block diagram illustrating a spot detecting system according to an exemplary embodiment of the invention.

Referring to FIG. 1, an exemplary embodiment of the spot detecting system 100 includes a display panel 200 and a spot detecting apparatus 300.

The display panel 200 displays an image. In an exemplary embodiment, the display panel 200 may be a liquid crystal display ("LCD") panel including a liquid crystal, for example. Alternatively, the display panel 200 may be an organic light emitting diode ("OLED") display panel including an OLED. The display panel 200 outputs display panel data DPD corresponding to the image. In one exemplary embodiment, for example, the image displayed on the display panel 200 may be an image for inspecting the display panel 200, and thus the display panel data DPD output from the display panel 200 may be data corresponding to the image for inspecting the display panel 200.

The spot detecting apparatus 300 includes a camera 400 and a spot detecting part (or a spot detector) 500.

In an exemplary embodiment, the camera 400 photographs the image displayed on the display panel 200. Specifically, the camera 400 photographs the image displayed on the display panel 200, in a first resolution to output first resolution image data. In such an embodiment, the camera 400 photographs the image displayed on the display panel 200, in a second resolution to output second resolution image data. In such an embodiment, the second resolution is higher than the first resolution. In one exemplary embodiment, for example, the second resolution may be substantially the same as that of the image displayed on the display panel 200, and the first resolution may be lower than that of the image displayed on the display panel 200. In one exemplary embodiment, for example, the camera 400 may be two-dimensional charged coupled device ("CCD") camera such as an area scan camera and a frame camera. The camera 400 may be referred to as a photographing part.

In an exemplary embodiment, the spot detecting part 500 receives the first resolution image data RID1 and the second resolution image data RID2 from the camera 400. The spot detecting part 500 detects a spot included in the image displayed on the display panel 200, using the first resolution image data RID1 and the second resolution image data RID2 received from the camera 400. In such an embodiment, the spot in the image may include a first spot greater than or equal to a reference size, and a second spot less than the reference size, and the spot detecting part 500 detects the second spot less than the reference size, using the first resolution image data RID1 and the second resolution image data RID2. Here, the first spot may be referred to as a normal spot, and the second spot may be referred to as a tiny spot. In one exemplary embodiment, for example, each of the first spot and the second spot may be a white spot. The spot detecting part 500 detects the second spot, and outputs tiny spot data TSD which is data of the second spot.

The spot detecting apparatus 300 may further include a display part 600 for displaying a process of the spot detecting part 500.

Figure 2:
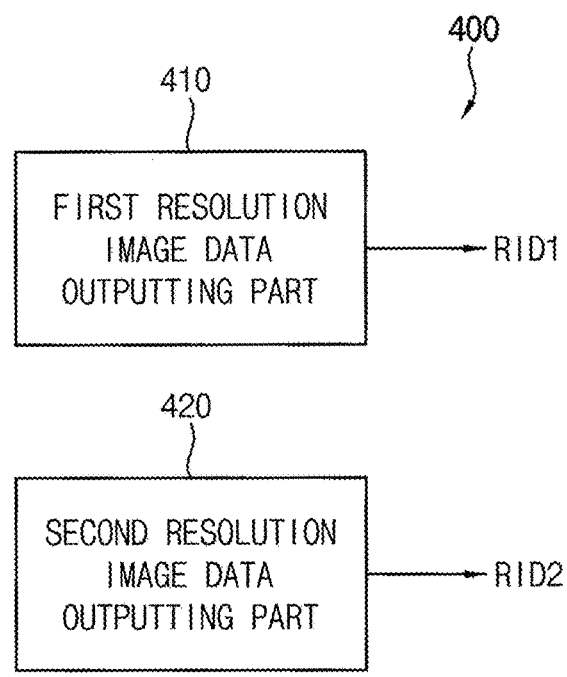
FIG. 2 is a block diagram illustrating an exemplary embodiment of a camera of FIG. 1.

FIG. 2 is a block diagram illustrating an exemplary embodiment of the camera 400 of FIG. 1.

Referring to FIGS. 1 and 2, an exemplary embodiment of the camera 400 includes a first resolution image data outputting part 410 and a second resolution image data outputting part 420.

The first resolution image data outputting part 410 photographs the image displayed on the display panel, in the first resolution, to output the first resolution image data RID1. The first resolution image data outputting part 410 may include N×N pixel filter. Here, N is a natural number greater than or equal to tow, and may be determined based on a maximum width of the second spot to be detected by the spot detecting apparatus 300. In one exemplary embodiment, for example, the first resolution image data outputting part 410 may include 21×21 pixel filter.

The second resolution image data outputting part 420 photographs the image displayed on the display panel, in the second resolution, to output the second resolution image data RID2. The second resolution image data outputting part 420 may include M×M pixel filter. Here, M is a natural number less than N, and may be determined according to a minimum width of the second spot to be detected by the spot detecting apparatus 300. In one exemplary embodiment, for example, the second resolution image data outputting part 420 may include 3×3 pixel filter.

Figure 3:
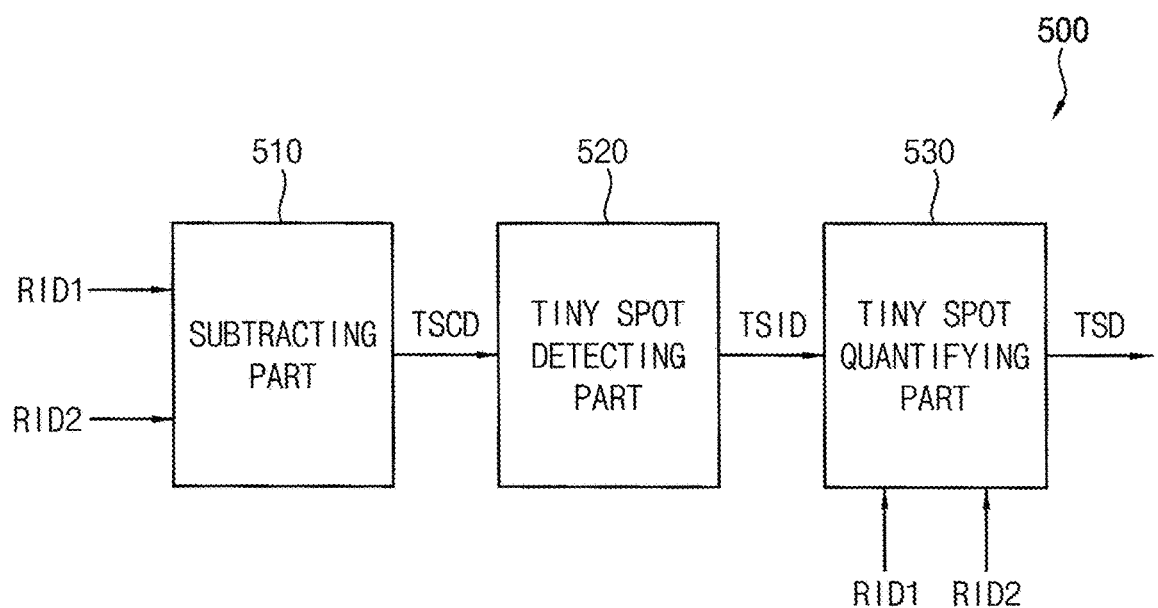
FIG. 3 is a block diagram illustrating an exemplary embodiment of a spot detecting part of FIG. 1.

FIG. 3 is a block diagram illustrating an exemplary embodiment of the spot detecting part 500 of FIG. 1.

Referring to FIGS. 1 to 3, an exemplary embodiment of the spot detecting part 500 includes a subtracting part 510, a tiny spot detecting part 520 and a tiny spot quantifying part 530.

In an exemplary embodiment, the subtracting part 510 receives the first resolution image data RID1 and the second resolution image data RID2 from the camera 400. The subtracting part 510 subtracts the first resolution image data RID1 from the second resolution image data RID2 to output tiny spot candidate data TSCD including the second spot. Here, the tiny spot candidate data TSCD may include noise in addition to the second spot. In one exemplary embodiment, for example, the noise may be caused by light generated from the camera 400.

In such an embodiment, the tiny spot detecting part 520 receives the tiny spot candidate data TSCD from the subtracting part 510. The tiny spot detecting part 520 removes the noise different from the first spot and the second spot, from the tiny spot candidate data TSCD, to detect the second spot. The tiny spot detecting part 520 outputs tiny spot image data TSID corresponding to the second spot.

The tiny spot quantifying part 530 receives the tiny spot image data TSID from the tiny spot detecting part 520. The tiny spot quantifying part 530 quantifies the second spot using the tiny spot image data TSID received from the tiny spot detecting part 520. The tiny spot quantifying part 530 quantifies the second spot to output the tiny spot data TSD.

Figure 4:
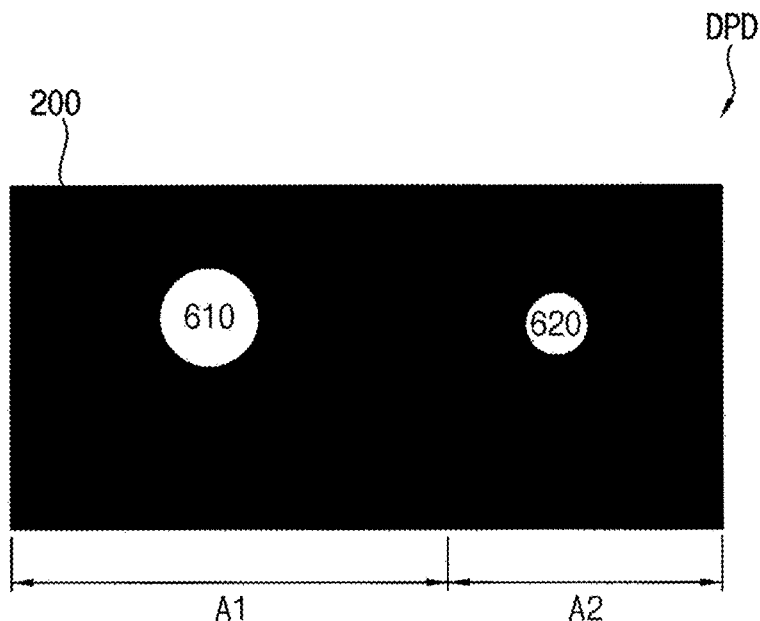
FIG. 4 is a screen showing display panel data output from a display panel of FIG. 1.

FIG. 4 is a screen showing the display panel data DPD output from the display panel 200 of FIG. 1.

Referring to FIGS. 1 and 4, the display panel data DPD may include a first spot 610 and a second spot 620. Each of the first spot 610 and the second spot 620 may be a white spot. A size of the first spot 610 is not less than (i.e., greater than or equal to) the reference size, and a size of the second spot 620 is less than the reference size. Each of the first spot 610 and the second spot 620 is viewed by a human eye or visible to a naked eye. The first spot 610 may be more easily recognized by a human eye than the second spot 620. The second spot 620 may be less easily recognized a human eye than the first spot 610. Thus, the first spot 610 may be referred to as a normal spot, and the second spot 620 may be referred to as a tiny spot. In one exemplary embodiment, for example, the first spot 610 may be displayed on a first area A1 of the display panel 200, and the second spot 620 may be displayed on a second area A2 of the display panel 200.

Figure 5A:
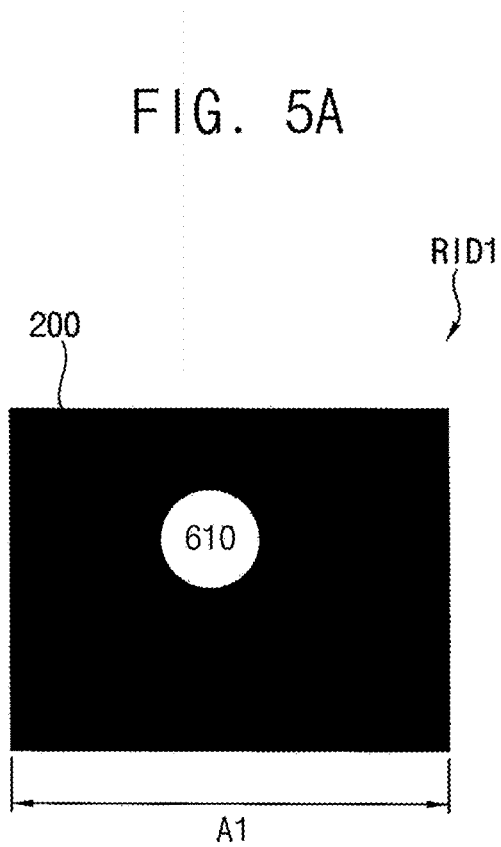
FIG. 5A is a screen showing a first area of FIG. 4 in first resolution image data of FIGS. 1 to 3.
Figure 5B:
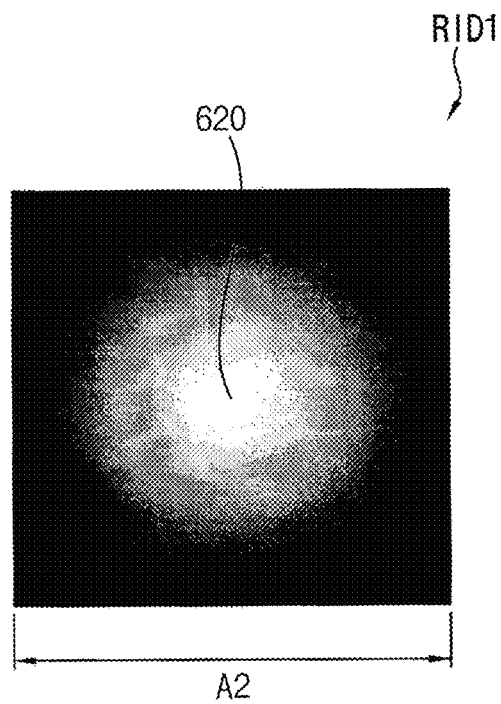
FIG. 5B is a screen showing a second area of FIG. 4 in the first resolution image data of FIGS. 1 to 3.
Figure 6A:
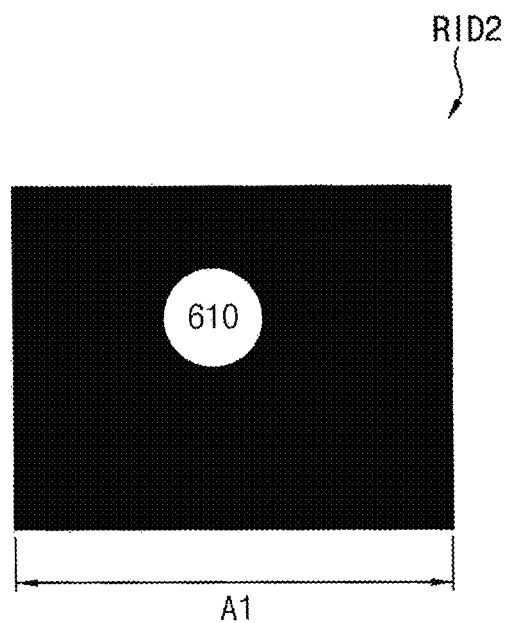
FIG. 6A is a screen showing a first area of FIG. 4 in second resolution image data of FIGS. 1 to 3.
Figure 6B:
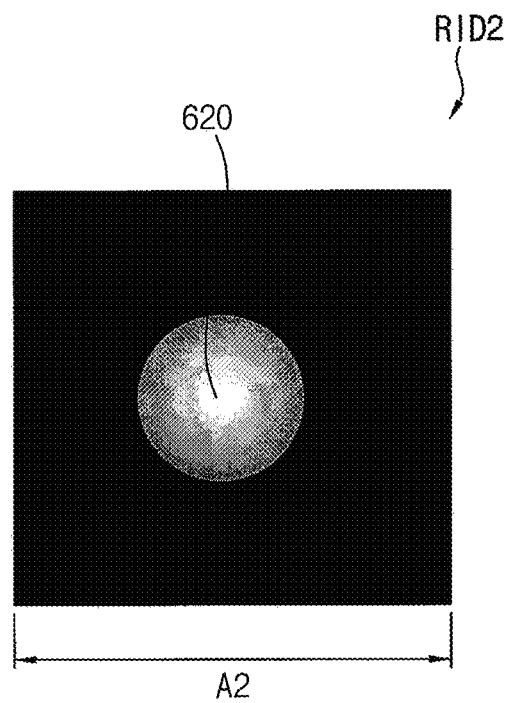
FIG. 6B is a screen showing a second area of FIG. 4 in the second resolution image data of FIGS. 1 to 3.

FIG. 5A is a screen showing the first area A1 of FIG. 4 in the first resolution image data RID1 of FIGS. 1 to 3. FIG. 5B is a screen showing the second area A2 of FIG. 4 in the first resolution image data RID1 of FIGS. 1 to 3. FIG. 6A is a screen showing the first area A1 of FIG. 4 in the second resolution image data RID2 of FIGS. 1 to 3. FIG. 6B is a screen showing the second area A2 of FIG. 4 in the second resolution image data RID2 of FIGS. 1 to 3.

Referring to FIGS. 1 to 6B, since the size of the first spot 610 is greater than the size of the second spot 620, a definition of the first spot 610 in the first resolution image data RID1 and a definition of the first spot 610 in the second resolution image data RID2 may be similar or may be substantially the same as each other.

Since the size of the second spot 620 is less than the size of the first spot 610, a definition of the second spot 620 in the first resolution image data RID1 may be less than a definition of the second spot 620 in the second resolution image data RID2.

Figure 7A:
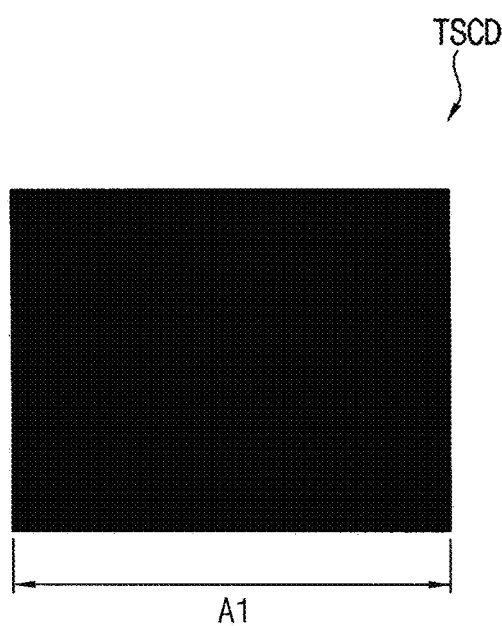
FIG. 7A is a screen showing the first area of FIG. 4 in tiny spot candidate data of FIG. 3.
Figure 7B:
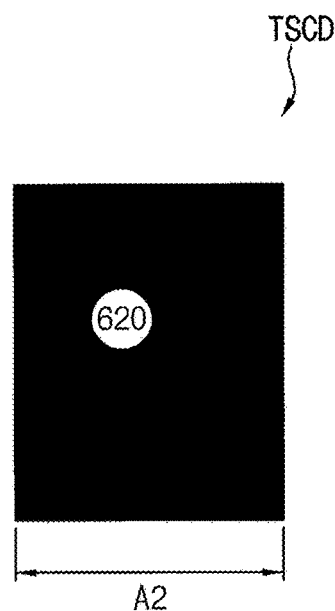
FIG. 7B is a screen showing the second area of FIG. 4 in the tiny spot candidate data of FIG. 3.

FIG. 7A is a screen showing the first area A1 of FIG. 4 in the tiny spot candidate data TSCD of FIG. 3. FIG. 7B is a screen showing the second area A2 of FIG. 4 in the tiny spot candidate data TSCD of FIG. 3.

Referring to FIGS. 1 to 7B, the subtracting part 510 subtracts the first resolution image data RID1 from the second resolution image data RID2. Since the definition of the first spot 610 in the first resolution image data RID1 and the definition of the first spot 610 in the second resolution image data RID2 is substantially the same, the first spot 610 may be removed and may not be displayed in the tiny spot candidate data TSCD. Since the definition of the second spot 620 in the first resolution image data RID1 is less than the definition of the second spot 620 in the second resolution image data RID2, at least some of the second spot 620 may be displayed in the tiny spot candidate data TSCD. Therefore, the subtracting part 510 may increase a removing rate of an area except for the second spot 620 compared to a removing rate of the second spot 620. Thus, the spot detecting apparatus 300 may automatically detect the second spot 620 which is too small to be easily recognized by a human eye, that is, to be readily visible to a naked eye.

Figure 8A:
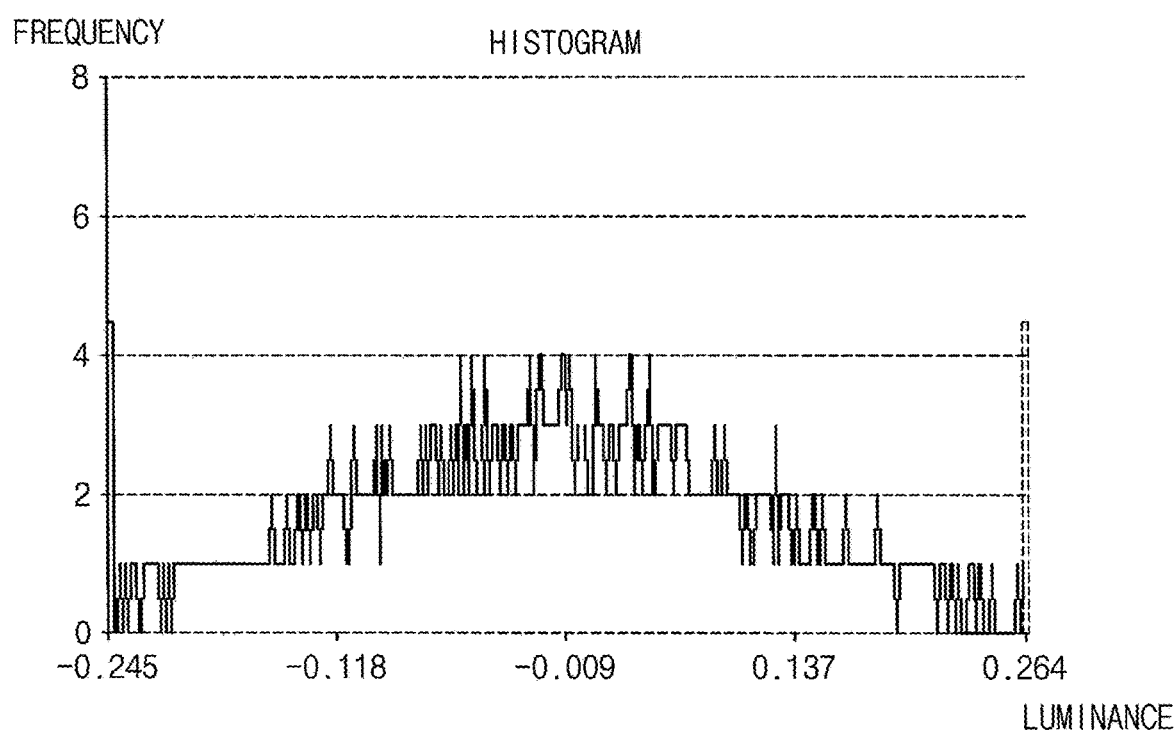
FIG. 8A is a histogram illustrating a noise in the tiny spot candidate data of FIG. 3.

FIG. 8A is a histogram illustrating the noise in the tiny spot candidate data TSCD of FIG. 3.

Referring to FIGS. 1, 3 and 8A, in the histogram, a vertical axis indicates a luminance of the noise which is detected by a difference between the first resolution image data RID1 and the second resolution image data RID2. In the histogram, a horizontal axis indicates a frequency of the luminance. As shown in FIG. 8A, the noise may have a Gaussian normal distribution.

Figure 8B:
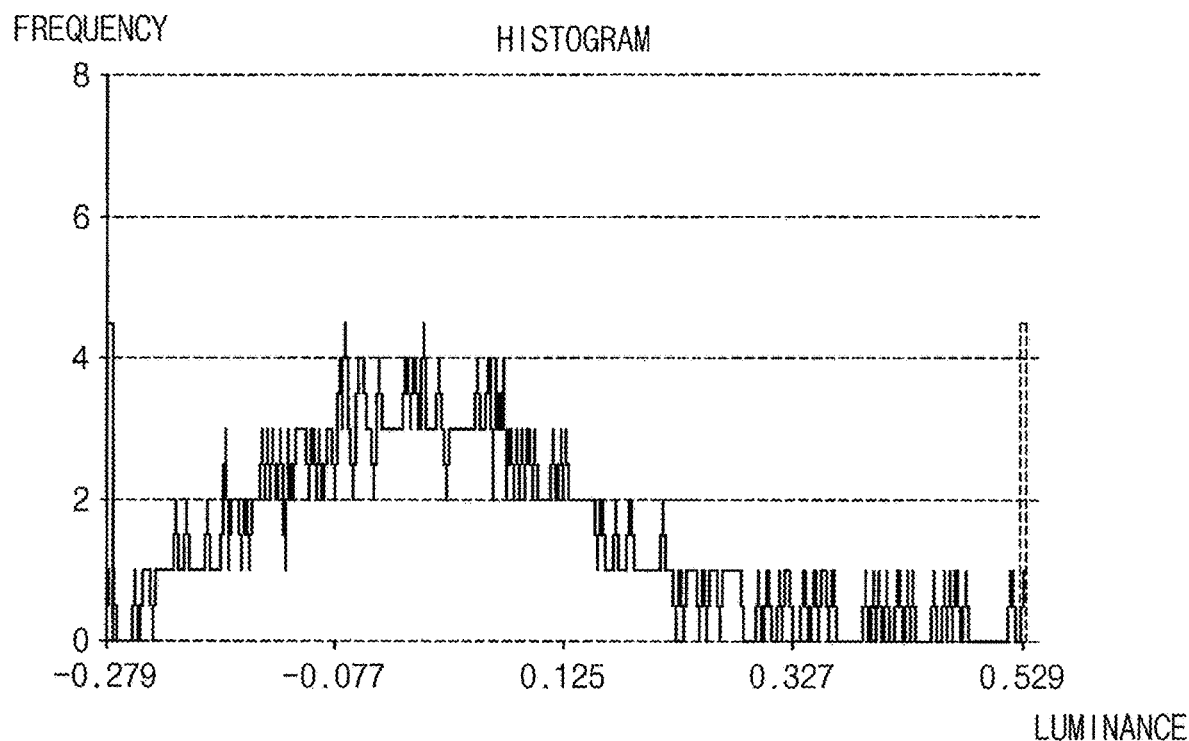
FIG. 8B is a histogram illustrating the second spot and the noise in the tiny spot candidate data of FIG. 3.

FIG. 8B is a histogram illustrating the second spot and the noise in the tiny spot candidate data TSCD of FIG. 3.

Referring to FIGS. 1, 3 and 8B, in the histogram, a vertical axis indicates a luminance of the second spot and the noise which is detected by a difference between the first resolution image data RID1 and the second resolution image data RID2. In the histogram, a horizontal axis indicates a frequency of the luminance.

Since the noise has the Gaussian normal distribution as shown in FIG. 8A, the tiny spot detecting part 520 may detect the second spot in an area except for an area corresponding to the Gaussian normal distribution. In an exemplary embodiment, the tiny spot detecting part 520 may detect the second spot in an area except for an area corresponding to L* standard deviation (L is a natural number). In one exemplary embodiment, for example, the tiny spot detecting part 520 may detect the second spot in an area except for an area corresponding to 6* standard deviation. The tiny spot detecting part 520 may detect the second spot in K×K pixel unit (K is a natural number).

Figure 9:
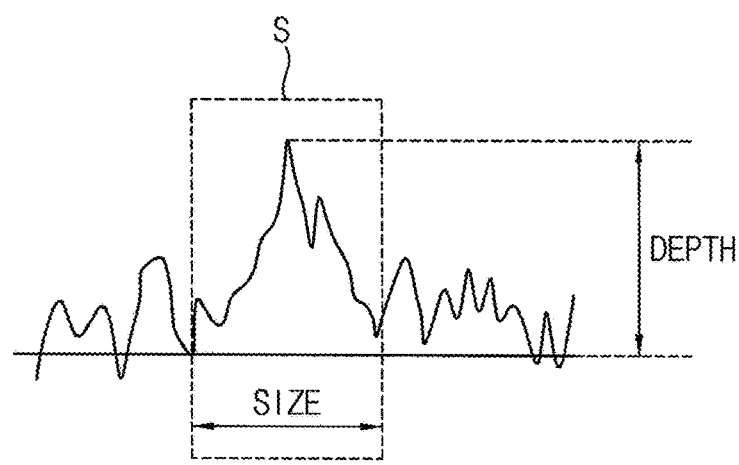
FIG. 9 is a graph illustrating the second spot of FIG. 4.

FIG. 9 is a graph illustrating the second spot 620 of FIG. 4.

Referring to FIGS. 1 to 9, a level (y-axis value) of a spot area graph S illustrating the second spot 620 increases compared to levels of both sides of the spot area graph S. In the spot area graph S, a length of a horizontal axis indicates the size of the second spot 620, and a height of a vertical axis indicates a depth of the second spot 620. Here, the depth of the second spot 620 may be a density and a strength.

In an exemplary embodiment, the tiny spot quantifying part 530 receives the tiny spot image data TSID. In such an embodiment, the tiny spot quantifying part 530 receives the first resolution image data RID1 and the second resolution image data RID2. The tiny spot quantifying part 530 may calculate the depth of the second spot 620 using the first resolution image data RID1 and the second resolution image data RID2 having resolutions different from each other.

The tiny spot quantifying part 530 quantifies the second spot 620 in consideration of the size and the depth of the second spot 620. The tiny spot quantifying part 530 quantifies the second spot 620, and outputs the tiny spot data TSD.

A spot compensating apparatus disposed outside of the spot detecting system 100 may compensate for the second spot 620 based on the tiny spot data TSD output from the spot detecting apparatus 300.

FIG. 10 is a flowchart illustrating an exemplary embodiment of a method of detecting a spot using the spot detecting apparatus 300 of FIG. 1.

Referring to FIGS. 1 to 10, in an exemplary embodiment, the image displayed on the display panel 200 is photographed in the first resolution, and the first resolution image data RID1 is output (S110). In such an embodiment, the camera 400 may photograph the image displayed on the display panel 200, in the first resolution, to output first resolution image data RID1.

In an exemplary embodiment, the image displayed on the display panel 200 is photographed in the second resolution, and the second resolution image data RID2 is output (S120). In such an embodiment, the camera 400 may photograph the image displayed on the display panel 200, in the second resolution, to output the second resolution image data. Here, the second resolution is higher than the first resolution. In one exemplary embodiment, for example, the second resolution may be substantially the same as that of the image displayed on the display panel 200, and the first resolution may be lower than that of the image displayed on the display panel 200.

In an exemplary embodiment, the first resolution image data RID1 is subtracted from the second resolution image data RID2, and the tiny spot candidate data TSCD is output (S130). In such an embodiment, the subtracting part 510 of the spot detecting part 500 may receive the first resolution image data RID1 and the second resolution image data RID2 from the camera 400. The subtracting part 510 subtracts the first resolution image data RID1 from the second resolution image data RID2 to output the tiny spot candidate data TSCD including the second spot 620. Here, the tiny spot candidate data TSCD may include the noise in addition to the second spot 620. In such an embodiment, the noise may be caused by light generated from the camera 400.

The noise is removed from the tiny spot candidate data TSCD, and the tiny spot image data TSID is output (S140). In an exemplary embodiment, the tiny spot detecting part 520 of the spot detecting part 500 may receive the tiny spot candidate data TSCD from the subtracting part 510. The tiny spot detecting part 520 removes the noise different from the first spot 610 and the second spot 620, from the tiny spot candidate data TSCD, to detect the second spot 620. The tiny spot detecting part 520 outputs the tiny spot image data TSID corresponding to the second spot.

In such an embodiment, since the noise has the Gaussian normal distribution as shown in FIG. 8A, the tiny spot detecting part 520 may detect the second spot 620 in the area except for the area corresponding to the Gaussian normal distribution. In an exemplary embodiment, the tiny spot detecting part 520 may detect the second spot 620 in the area except for the area corresponding to L* standard deviation (L is a natural number). In one exemplary embodiment, for example, the tiny spot detecting part 520 may detect the second spot 620 in the area except for the area corresponding to 6* standard deviation. The tiny spot detecting part 520 may detect the second spot 620 in K×K pixel unit (K is a natural number).

The tiny spot image data TSID is quantified, and the tiny spot data TSD is output (S150). In an exemplary embodiment, the tiny spot quantifying part 530 receives the tiny spot image data TSID from the tiny spot detecting part 520. The tiny spot quantifying part 530 quantifies the second spot 620 using the tiny spot image data TSID received from the tiny spot detecting part 520. The tiny spot quantifying part 530 quantifies the second spot 620 based on the size and the depth of the second spot 620. The tiny spot quantifying part 530 quantifies the second spot 620, and outputs the tiny spot data TSD.

According to an exemplary embodiment, the spot detecting system 100 may automatically detect the second spot 620, which is tiny and is not recognized easily by a human eye. Therefore, a spot compensating apparatus (not shown) disposed outside the spot detecting system 100 may compensate for the second spot 620 according to the tiny spot data TSD output from the spot detecting apparatus 300. Thus, display quality of a display apparatus including the display panel 200 may be improved.

Exemplary embodiments of the invention may be applied to a detect inspection and a defect removal of an electronic device having a display apparatus. In one exemplary embodiment, for example, the invention may be applied to a detect inspection and a defect removal of a television, a computer monitor, a laptop, a digital camera, a cellular phone, a smart phone, a tablet personal computer ("PC"), a smart pad, a personal digital assistant ("PDA"), a portable multimedia player ("PMP"), an MP3 player, a navigation system, a camcorder, a portable game console, or the like.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A spot detecting apparatus comprising:
a photographing part which photographs, in a first resolution, an image displayed on a display panel to output first resolution image data, and photographs, in a second resolution, the image displayed on the display panel to output second resolution image data, wherein the second resolution is higher than the first resolution, and the image displayed on the display panel includes a first spot greater than or equal to a reference size and a second spot less than the reference size; and
a spot detecting part which receives the first resolution image data and the second resolution image data, and subtracts the first resolution image data from the second resolution image data to detect the second spot, and
wherein the photographing part comprises:
a first resolution image data outputting part which photographs the image displayed on the display panel, in the first resolution, to output the first resolution image data; and
a second resolution image data outputting part which photographs the image displayed on the display panel, in the second resolution, to output the second resolution image data.

2. The spot detecting apparatus of claim 1, wherein the spot detecting part comprises:
a subtracting part which subtracts the first resolution image data from the second resolution image data to output tiny spot candidate data including the second spot.

3. The spot detecting apparatus of claim 2, wherein the spot detecting part further comprises:
a tiny spot detecting part which removes a noise, which is different from the first spot and the second spot, from the tiny spot candidate data to detect the second spot.

4. The spot detecting apparatus of claim 3, wherein
the noise includes a Gaussian normal distribution, and
the tiny spot detecting part detects the second spot in an area except for an area corresponding to the Gaussian normal distribution.

5. The spot detecting apparatus of claim 4, wherein
the tiny spot detecting part detects the second spot in an area except for an area corresponding to L* standard deviation in a histogram of the noise and the second spot, and
L is a natural number.

6. The spot detecting apparatus of claim 3, wherein the spot detecting part further comprises:
a tiny spot quantifying part which quantifies tiny spot image data corresponding to the second spot.

7. The spot detecting apparatus of claim 6, wherein the tiny spot quantifying part outputs tiny spot data, which is generated by quantifying the second spot based on a size and a depth of the second spot.

8. The spot detecting apparatus of claim 7, wherein
a length of a horizontal axis in a graph showing the second spot denotes the size of the second spot, and
a height of a vertical axis in the graph showing the second spot denotes the depth of the second spot.

9. The spot detecting apparatus of claim 1, wherein
the first resolution image data outputting part includes N×N pixel filter, wherein N is a natural number greater than or equal to two, and
the second resolution image data outputting part includes M×M pixel filter, wherein M is a natural number less than N.

10. The spot detecting apparatus of claim 9, wherein
N is determined based on a maximum width of the second spot, and
M is determined according to a minimum width of the second spot.

11. The spot detecting apparatus of claim 1, wherein the spot detecting part increases a removing rate of an area except for the second spot compared to a removing rate of the second spot, when the subtracting part subtracts the first resolution image data from the second resolution image data.

12. The spot detecting apparatus of claim 1, wherein the second resolution is the same as a resolution of the display panel.

13. The spot detecting apparatus of claim 1, wherein each of the first spot and the second spot is a white spot.

14. A method of detecting a spot, the method comprising:
photographing, in a first resolution, an image displayed on a display panel to output first resolution image data, wherein the image displayed on the display panel includes a first spot greater than or equal to a reference size and a second spot less than the reference size;
photographing, in a second resolution, the image displayed on the display panel to output second resolution image data, wherein the second resolution is higher than the first resolution; and
subtracting the first resolution image data from the second resolution image data to detect the second spot,
wherein the detecting the second spot comprises:
outputting tiny spot candidate data including the second spot; and
removing a noise, which is different from the first spot and the second spot, from the tiny spot candidate data to detect the second spot.

15. The method of claim 14, wherein the removing the noise from the tiny spot candidate data comprises detecting the second spot in an area except for an area corresponding to a Gaussian normal distribution.

16. A method of detecting a spot, the method comprising:
photographing, in a first resolution, an image displayed on a display panel to output first resolution image data, wherein the image displayed on the display panel includes a first spot greater than or equal to a reference size and a second spot less than the reference size;
photographing, in a second resolution, the image displayed on the display panel to output second resolution image data, wherein the second resolution is higher than the first resolution;
subtracting the first resolution image data from the second resolution image data to detect the second spot, and
quantifying tiny spot image data corresponding to the second spot.

17. The method of claim 16, wherein the quantifying the tiny spot image data comprises outputting tiny spot data, which is generated by quantifying the second spot based on a size and a depth of the second spot.

18. The method of claim 14, wherein the subtracting the first resolution image data from the second resolution image data to detect the second spot comprises increasing a removing rate of an area except for the second spot compared to a removing rate of the second spot.

* * * * *